(12) United States Patent
Hahn

(10) Patent No.: US 7,292,028 B2
(45) Date of Patent: Nov. 6, 2007

(54) APPARATUS FOR SENSING THE ABSOLUTE-VALUE ANGLE OF A SHAFT

(75) Inventor: Alexander Hahn, Sauldorf-Boll (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 314 days.

(21) Appl. No.: 10/671,909

(22) Filed: Sep. 25, 2003

(65) Prior Publication Data

US 2004/0070392 A1   Apr. 15, 2004

(30) Foreign Application Priority Data

Oct. 10, 2002  (DE) ............................ 102 47 360

(51) Int. Cl.
*G01B 7/30* (2006.01)
(52) U.S. Cl. .................... 324/207.25; 324/207.21
(58) Field of Classification Search ............ 324/207.2, 324/207.22, 207.25, 207.12, 207.18, 207.21, 324/207.13, 175, 160, 166, 163, 165, 162, 324/173

See application file for complete search history.

(56) References Cited

U.S. PATENT DOCUMENTS

| | | | | |
|---|---|---|---|---|
| 3,772,675 A | * | 11/1973 | Bose et al. | 341/15 |
| 4,853,632 A | * | 8/1989 | Nagano et al. | 324/207.21 |
| 5,646,523 A | * | 7/1997 | Kaiser et al. | 324/207.2 |

(Continued)

FOREIGN PATENT DOCUMENTS

DE   198 20 014   11/1999

(Continued)

OTHER PUBLICATIONS

Webster's English Dictionary, online version. http://www.cs.chalmers.se/~hallgren/wget.cgi?beyond, dated Aug. 4, 2005.*

(Continued)

*Primary Examiner*—Edward Lefkowitz
*Assistant Examiner*—David M Schindler
(74) *Attorney, Agent, or Firm*—Milton Oliver; Ware Fressola Van Der Sluys & Adolphson LLP

(57) ABSTRACT

An apparatus serves to sense the absolute value of the rotational position of a shaft (14). The apparatus has a first single-turn rotary encoder (30) that is arranged at one end (20) of the shaft (14) and is arranged to sense the latter's rotational position within a single shaft revolution. Also provided are: a multi-turn rotary encoder unit which senses the number of revolutions of the shaft (14) and which comprises a reduction gear linkage (18); a rotary element (42), driven by the output of the linkage, that is oriented as an imaginary continuation of the shaft (14) and coaxially therewith; and a second single-turn rotary encoder (48) which is arranged to sense the rotational position of the rotary element (42) within a single revolution. The reduction gear linkage (18) surrounds the shaft (14), and its output element (38) is connected, via a connecting member (40), to said rotary element (42) around the first single-turn rotary encoder (30). An unusually compact combination motor/encoder unit can thereby be achieved, suitable for installation in small spaces, e.g. a few centimeters wide.

14 Claims, 4 Drawing Sheets

U.S. PATENT DOCUMENTS

| | | | |
|---|---|---|---|
| 5,925,953 A * | 7/1999 | Shibata | 310/83 |
| 6,542,088 B1 * | 4/2003 | Bielski et al. | 341/15 |
| 6,733,457 B2 * | 5/2004 | Flesch et al. | 600/459 |
| 2002/0167309 A1 * | 11/2002 | Chaparala | 324/207.21 |
| 2003/0056606 A1 * | 3/2003 | Matsuura et al. | 73/862.191 |
| 2003/0112157 A1 | 6/2003 | Strasser | 341/2 |
| 2004/0100251 A1 * | 5/2004 | Lohberg | 324/166 |

FOREIGN PATENT DOCUMENTS

| | | |
|---|---|---|
| DE | 100 60 574 | 6/2002 |
| WO | WO 0210689 A1 * | 2/2002 |

OTHER PUBLICATIONS http://dictionary.reference.com/, dated Aug. 5, 2005.*
Lamers et al., "A Miniature Multiturn Encoder Sets New Standards in Size," in Heidenhain Info, vol. 8, Issue 1, pp. 1-6 (2002), publ. by Dr. Johannes Heidenhain GmbH of Trautrent, Germany. (Apparently an English translation of the foregoing German-language article).

* cited by examiner

APPARATUS FOR SENSING THE ABSOLUTE-VALUE ANGLE OF A SHAFT

REFERENCE TO RELATED APPLICATION

This application claims priority from German application DE 10247360, filed Oct. 10, 2002, the disclosure of which is incorporated herein.

FIELD OF THE INVENTION

The invention relates to an apparatus for sensing the absolute value of the rotational position of a shaft.

BACKGROUND

Electric motors whose dimensions are often in the range of only a few centimeters are used as actuating drives in many technical fields, for example robotics, automotive engineering, or materials handling. In such applications, it is usually necessary to acquire information regarding the spatial position of the element driven by the electric motor. This positional information can relate, for example, to the opening width of a gripper or to the height of an electrically adjustable vehicle seat. Based on this positional information, a control system can determine, for example, how many revolutions the electric motor must perform, in order to move the element in question into a new desired position.

Numerous concepts have been developed for determining the position of such elements driven by actuating motors. On the one hand, it is possible, of course, to sense the spatial position of the driven element directly. Taking the example of the motor vehicle seat whose height is electrically adjustable, this would mean that its height is measured directly, with respect to a fixed reference point, using a suitable sensor apparatus. This type of direct position sensing is very complex in many cases, however, since the sensor apparatus must be specifically adapted to the particular intended use.

Concepts in which the spatial position of the arrangement is determined only indirectly, via the angular position of the electric motor shaft, are therefore more favorable. This type of indirect position determination is possible whenever the element is driven in slippage-free fashion by the electric motor. Depending on the application, it may be sufficient, in this context, merely to ascertain the number of shaft revolutions that have taken place since a reference point in time. If the requirements in terms of position determination accuracy are more stringent, the angular position of the shaft within a single revolution can also be sensed, and used to determine the position of the driven element.

Sensing, in this fashion, both the number of shaft revolutions and the shaft's angular position within one revolution means simply that the absolute angular position is determined. For example, two revolutions plus 22° in the positive rotation direction corresponds to an absolute angle of 742°. Once the correlation between the spatial position of the element driven by the electric motor and the absolute angle has been determined, e.g. by calibration, a knowledge of the absolute angle therefore allows the position of the element to be inferred.

Electronic revolution counters can be employed in order to sense the absolute angle of the shaft of an electric motor. They exploit the fact that precisely those electric motors used as actuating drives are often electronically commutated. In electronic commutation, the angular position of the shaft is sensed accurately (albeit over only one revolution) so that depending on the instantaneous relative spatial arrangement between stator and rotor, the motor can thereby have voltage optimally applied to it. The absolute rotary encoders used for this furnish a periodic output signal, so that, by means of a suitable electronic analysis system, the number of revolutions can also be ascertained. An early encoder is disclosed in U.S. Pat. No. 3,772,675, now expired.

A disadvantage of this approach, however, is the fact that, following a supply voltage interruption, although the rotary encoder is capable of once again sensing the absolute angular position of the shaft, the information as to how many revolutions the electric motor shaft has already completed is lost, as a result of the supply voltage interruption. As a consequence, the actuating drive must then be recalibrated, using reference point data or the like; this entails high cost. It is possible, in principle, to resort to a voltage supply with battery backup, but this results in additional manufacturing costs and moreover requires regular maintenance, since the batteries must be replaced or recharged on a scheduled basis.

In order to eliminate these disadvantages associated with electronic revolution counters, it has now become common to use rotary encoders that, in mechanical fashion, not only sense the angular position within one revolution of the shaft, as is the case with so-called single-turn rotary encoders, but also allow a determination of the absolute value of the angular position over a number of revolutions. Such rotary encoders are often referred to as "multi-turn" encoders, expressing the fact that the angular position can also be determined absolutely over several turns or revolutions. These mechanical multi-turn rotary encoders reduce the motor rotation speed in one or more transmission stages. The output of each transmission stage is sensed using suitable sensors, and as a result the absolute angular position can be accurately and reliably ascertained independently of the voltage supply. The functional principle is thus similar to that of a mechanical analog clock, in which it is likewise possible, based on the angular position of the second, minute, and hour hands, to ascertain the absolute angle of the second hand over the last 24 hours.

A multi-turn encoder of this kind is known from DE 198 20 014 A1, which was the priority document for PCT/EP99/03056, whose US national phase matured into corresponding U.S. Pat. No. 6,542,088, BIELSKI et al, issued Apr. 1, 2003. This mechanical rotary encoder substantially comprises a single-turn rotary encoder that serves to ascertain the angular position within one revolution, and a multi-turn rotary encoder unit for determining the number of revolutions. In this known apparatus, the single-turn rotary encoder is constituted by a code disk which is directly coupled to the shaft whose angular position is to be determined. The code disk bears a coding which can be scanned in opto-electrical, magnetic, capacitive, or inductive fashion, and with which one revolution of the shaft is divided into a plurality of differentiable sectors. This coding is scanned by a scanning device which generates a multi-digit code word that is correlated with the absolute angular position. The multi-turn rotary encoder unit of the known rotary encoder comprises a reduction gear linkage, coupled to the shaft, whose output is sensed in angular terms by a single-turn rotary encoder. That output is connected to a second reduction gear linkage whose output is likewise sensed using a single-turn rotary encoder. The aforementioned elements of this apparatus are arranged one behind another in the axial direction, the input and output of each reduction gear linkage being, in particular, oriented coaxially; this corresponds to the usual design of small reduction gear linkages of this kind.

Multi-turn rotary encoders of this kind based on reduction gear linkages have the disadvantage, however, as compared to electronic revolution counters, that their dimensions are quite large (at least by comparison with electric motors). In many applications in which electric-motor actuating drives are used, however, the available installation space is very small, so that these mechanical multi-turn rotary encoders cannot always readily be integrated. Another multi-turn rotary encoder is described in DE 10060574-A1, which was the priority document for PCT/EP01/10966, filed Sep. 22, 2001, whose U.S. national phase is Ser. No. 10/181,536, published as US 2003/0112157 on Jun. 19, 2003.

SUMMARY OF THE INVENTION

It is therefore an object of the invention to make available an apparatus of the kind cited above, for sensing the absolute value of a shaft of a motor, the apparatus being physically compact.

According to the invention, this object is achieved by means of an apparatus having a first single-turn rotary encoder, mounted on an end of the motor shaft and adapted to sense the shaft's rotational position within a single revolution, and a reduction gear linkage coupled to the motor shaft, connected by a connecting member which passes around the first encoder, and driving a rotatable output element whose rotational position is sensed by a second rotary encoder.

Since the reduction gear linkage-driven rotary element whose angular position is sensed by the second single-turn rotary encoder is driven not, as is usual, by a gear linkage output arranged as an extension of the motor shaft, but rather from outside, around the first single-turn rotary encoder, there is no need for a shaft extending in the axial direction through the entire apparatus. Correspondingly, there is also no space lost in the axial. direction, due to bearings that are normally required to support such a shaft. The two single-turn rotary encoders and the reduction gear linkage can thus be arranged axially one behind the other, practically directly adjacent to one another, thereby resulting in a very short overall length.

Since the reduction gear linkage is placed directly onto the shaft, there is also no need for clutches that are usually used for connection between the electric motor shaft and the reduction gear linkage. This feature, too, contributes to a shorter overall length in the axial direction. For this reason, the reduction gear linkage can also be received in the housing of the electric motor, since additional installation space can often be created there above the shaft bearing on the side of opposite to the rotor. It is thereby possible to construct an extremely compact unit comprising electric motor and multi-turn rotary encoder, which is considerably shorter than the conventional arrangement of an electric motor having a multi-turn rotary encoder coupled thereto.

The multi-turn rotary encoder unit can of course have further multi-turn rotary encoder units placed after it, resulting in a three-stage or multi-stage configuration. Then either a second reduction gear linkage can drive a further rotary element in the manner according to the present invention, i.e. from outside around the rotary element, or the output of the further reduction gear linkage can be effected in known fashion in a place situated in an (imagined) continuation or projected "footprint" of the motor shaft.

In a particularly advantageous embodiment of the invention, the output is implemented as an output ring that can be caused, by the electric motor, to move coaxially with the shaft. The connecting part can thus engage the gear linkage in a manner spaced radially away from the shaft. Instead of a complete ring, an interrupted or incomplete ring or even simply a yoke can of course also be provided as the output ring.

The connecting part is then preferably implemented as an approximately angular cantilever yoke that engages on the output ring. The connecting element can also, however, be a larger segment of a cylindrical casing, or a construction made up of several yokes interconnected in lattice fashion.

In another advantageous embodiment of the invention, one or both single-turn rotary encoders each comprise a sensor, in particular a giant magneto-resistive (GMR) sensor (available from Infineon Technologies), and a permanent magnet coacting therewith. This permanent magnet can be arranged on an end face of the shaft in the case of the first single-turn rotary encoder, while, in the case of the second single-turn rotary encoder it can be arranged on the rotary element. The rotary element's only task is therefore to hold the permanent magnet. Magnetic sensors are particularly well suited for contact-free position measurements, and function very reliably even under difficult conditions, for example in a humid or dirty environment and at extreme temperatures. GMR sensors have the advantage over conventional Hall sensors of sensing only the direction of magnetic field lines, but not their intensity. The installation and alignment of this type of sensor, and mass production, are therefore more economical.

Since the apparatus according to the present invention permits very dense positioning, in the axial direction, of the sensors and the permanent magnets coacting therewith, it may be necessary to at least partially decouple the two rotary encoders from one another by means of a magnetic shield. This decreases the risk of measurement errors.

A shield of this kind is preferably arranged directly on the rotary element; it is also possible, however, to attach the shield to a sensor carrier that holds the sensors of the first and the second single-turn rotary encoders.

This is advisable in particular when the sensor carrier comprises a carrier part on whose upper side or lower sides are attached, respectively, the sensors of the first and the second single-turn rotary encoders; This arrangement of the two sensors "back to back," to so speak, allows a further decrease in the overall axial length, since, in this fashion, a second arm of the sensor carrier can be dispensed with.

If the requirements in terms of the precision with which the angular position of the shaft is sensed are lower, it may be sufficient to analyze only the values sensed by the second single-turn rotary encoder in the multi-turn rotary encoder unit. Whether even an at least rough determination of the absolute angular position of the shaft within one revolution is possible, with only this analysis, depends on the measurement-accuracy of the second single-turn rotary encoder and also, above all, on the reduction ratio of the reduction gear linkage. At very large reduction ratios, the second single-turn rotary encoder may ascertain essentially only the number of revolutions, while at small reduction ratios, conclusions as to the approximate angular position of the shaft within one revolution may also be possible. The angular positions within one revolution sensed by the first single-turn rotary encoder are then analyzed only in the context of the electronic commutation of the electric motor.

If the precision requirements are more stringent, on the other hand, it may be advisable to connect both the first and the second single-turn rotary encoder to an analysis device. The analysis device can then, in a manner known per se, use the absolute angular position within a single revolution sensed by means of the first single-turn rotary encoder, and on the other hand the number of revolutions ascertained using the second single-turn rotary encoder, for a particularly precise determination of the absolute angle.

BRIEF FIGURE DESCRIPTION

Further features and advantages of the invention are evident from the description below of an exemplary embodiment, with reference to the drawings, in which.

DETAILED DESCRIPTION

Figure 1:
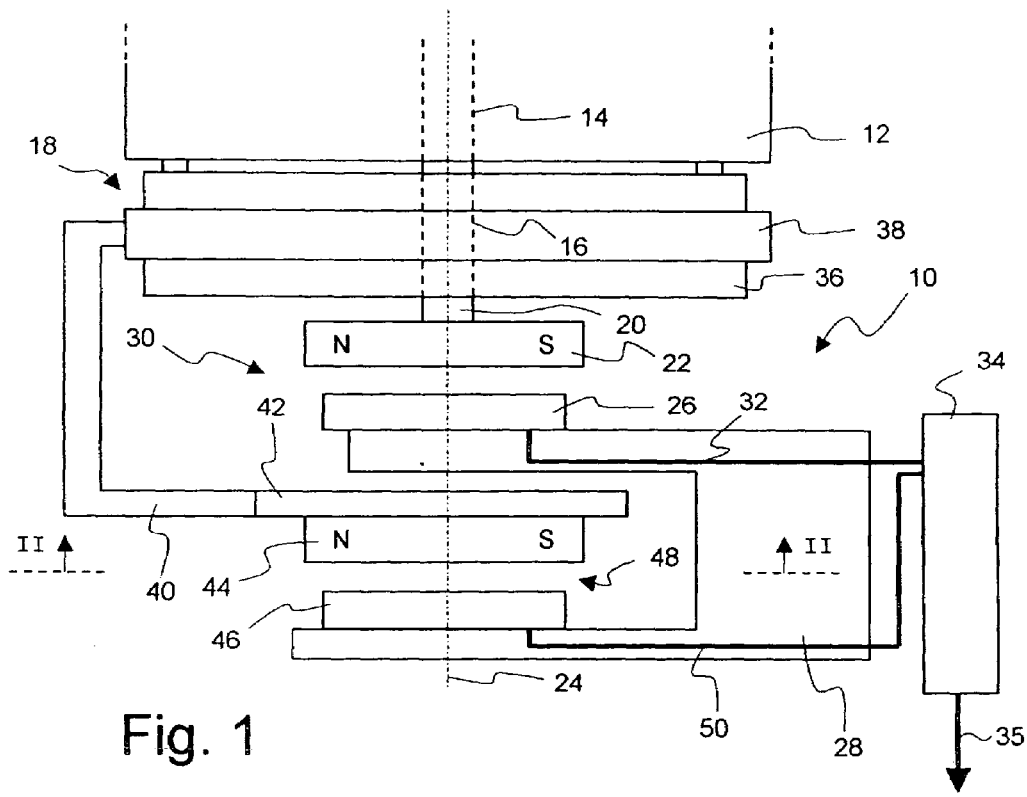
FIG. 1 is a highly schematic depiction, in a plan view, of a first embodiment of an apparatus according to the present invention.

FIG. 1 shows, schematically and not to scale, an apparatus, labeled as a whole with the number 10, for sensing the absolute angular position of a shaft of an electric motor.

Apparatus 10 is coupled to an electric motor (labeled 12) via the motor's shaft 14. A reduction gear linkage 18 is placed on a shaft stem 16, located opposite to the drive side of shaft 14, in such a way that shaft stem 16 penetrates completely through reduction gear linkage 18. A first control magnet 22 is mounted on an end 20 of shaft stem 16 that protrudes out of the end surface of reduction gear linkage 18. When electric motor 12 is in operation, first control magnet 22 therefore rotates synchronously with shaft 14 about the rotation axis labeled 24.

A first sensor 26 that is held by a sensor carrier 28 is immovably arranged directly opposite first control magnet 22. Because sensor carrier 28 is arranged nonrotatably (in a manner not shown in further detail) with respect to electric motor 12, first control magnet 22 rotates, relative to first sensor 26, at the rotation speed of shaft 14.

First control magnet 22 and first sensor 26, coacting therewith, together constitute a first single-turn rotary encoder 30 with which the absolute angular position of first control magnet 22, and therefore of shaft 14, can be sensed within one revolution. For that purpose, first sensor 26 is connected via a first signal line (labeled 32) to an analysis device or evaluation circuit 34.

Reduction gear linkage 18 comprises a gear linkage housing 36, retained nonrotatably with respect to electric motor 12, from which an output ring 38, rotatable about rotation axis 24, protrudes radially. When the electric motor is operating, output ring 38 rotates at a rotation speed that is stepped down from the rotation speed of shaft 14 by an amount equal to the reduction ratio. Mounted on output ring 38 via a yoke-like connecting part 40 is a rotary element 42 that, upon rotation of output ring 38, is likewise caused to rotate about rotation axis 24. Rotary element 42 can also be implemented integrally with connecting part 40, and the latter in turn integrally with output ring 38. Element 42 is aligned within an outline or "footprint" of an imaginary continuation or projection of shaft 14.

A second control magnet 44 is mounted nonrotatably on rotary element 42 so that, when electric motor 12 is operating, this second control magnet 44 rotates about rotation axis 24, with respect to first control magnet 22, only at the rotation speed that has been reduced by the reduction ratio.

Mounted on sensor carrier 28, opposite second control magnet 44, is a second sensor 46 that coacts with second control magnet 44 and senses the latter's rotation about rotation axis 24. Second control magnet 44 and second sensor 46 thus together constitute a second single-turn rotary encoder 48, whose measurement signals are likewise conveyed to analysis device 34 via a second signal line 50. An analysis result is output on a further signal line 35.

Figure 2:
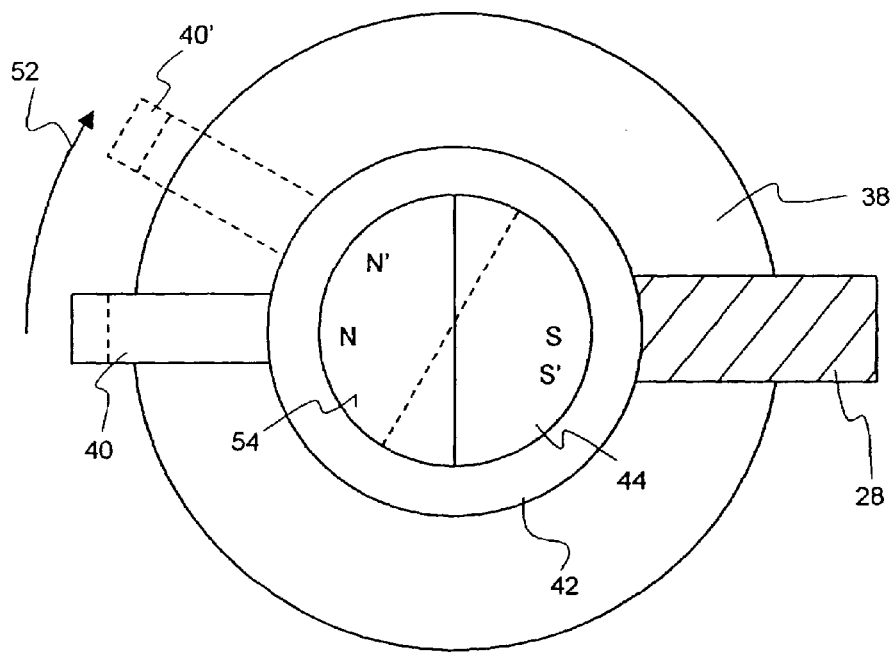
FIG. 2 shows the apparatus of FIG. 1 in an axial section along line II-II of FIG. 1.

FIG. 2 shows the apparatus 10 of FIG. 1 in a radial section along line II-II of FIG. 1. In order to illustrate the operation of apparatus 10, connecting part 40 is shown with dashed lines (and labeled 40') in a position that exists after an integral number of revolutions of shaft 14 at a given reduction ratio. An arrow 52 in FIG. 2 indicates that with each revolution of shaft 14, output ring 38 continuously moves, together with connecting part 40 mounted thereon, in the direction of arrow 52 until the position of connecting part 40 labeled 40' is reached after electric motor 12 is shut off.

Second control magnet 44 that is fixed to connecting part 40 also executes this rotary motion (which is slower than the rotation of shaft 14); this is indicated on end surface 54 of control magnet 44 by a dashed line and by poles N' and S'. Second sensor 46, which is retained by sensor carrier 28 nonrotatably with respect to electric motor 12, does not execute this rotation, and in that manner senses the rotation angle of second control magnet 44. This rotation angle is thus an indication of the number of revolutions that shaft 14 has executed, starting from a reference position. From the measurement signal of second sensor 46 transmitted via conductor 50 to analysis device 34, it is thus possible to infer from the sensed rotation angle, using the reduction ratio of reduction gear linkage 18, the number of revolutions of shaft 14. The angular position of shaft 14 within one revolution, on the other hand, is derived from the measurement signals generated by first single-turn rotary encoder 30. If electric motor 12 is an electronically commutated electric motor, the signals generated by first single-turn rotary encoder 30 can also be used for electronically controlled commutation of electric motor 12.

A concrete implementation of apparatus 10 described above is shown in FIG. 3 in an axial section. Components that are reproduced schematically in FIG. 1 are labeled with the same reference numbers.

Shaft 14 of electric motor 12 is received in a substantially annular B-bearing plate 60 of the motor, and immobilized in the radial direction via a roller bearing labeled 62. Roller bearing 62 is held on an annular shoulder 66 of B-bearing plate 60 by means of a snap ring 64 in a correspondingly shaped recess. Shaft 14 tapers into a conical shaft stem 16, onto which a drive ring (labeled 68) of a reduction gear linkage 18 is nonrotatably press-fitted. Reduction gear linkage 18 comprises a gear linkage housing 36 that is retained nonrotatably with respect to B-bearing plate 60 via immobilization studs 70. The output of reduction gear linkage 18 is constituted by an output ring 38 that is constituted, in the exemplary embodiment depicted, by a flat ring 71 and multiple webs 72, projecting axially therefrom, which then converge again radially into a hub 74 loosely surrounding shaft stem 16.

A flathead screw 80 whose flat head 84 equipped with a hexagonal socket 82 clamps a magnet holder 86, preferably formed as a cast brass piece, against the end face of shaft stem 16, is threaded into a hole 78, equipped with an internal thread 76, in shaft stem 16. A first control magnet 22 is inserted nonrotatably into magnet holder 86. Control magnet 22 is separated from a first sensor 26 coacting therewith by an air gap 87. Sensor 26 is preferably a GMR sensor (such as those available from Infineon Technologies of Regensburg, Germany and San Jose Calif.) that senses the changes in magnetic field line direction produced in the course of a rotation, and converts them into electrical signals. By analyzing these electrical signals in an analysis device 34, it is possible to sense, absolutely and with high accuracy, the relative angular position, within one revolution, between first control magnet 22 and first sensor 26, as explained above with reference to FIG. 1. Since GMR single-turn rotary encoders of this kind are known, no further discussion thereof is necessary.

To ensure that the direction of the magnetic field lines sensed by first sensor 26 is not distorted by the magnetic field generated by the electric motor itself, B-bearing plate 60 is connected to a shielding plate 90 that is arranged between first sensor 26 and electric motor 12 and comprises a central opening 92 for magnet holder 86 and for control magnet 22 received therein.

Two of webs 72 of output ring 38 are connected by a connecting member 40 in the form of a U-shaped yoke that is bent 90 degrees inward and extends at the end into a space which is provided along rotation axis 24 behind first sensor 26. Mounted on angled segment 94, projecting into this region, of connecting member 40 is a disk-shaped shielding element 96 that carries a second magnet holder 98 having a second control magnet 44 received therein. The latter coacts with a second GMR sensor 46 that is mounted, together with first sensor 26, on a sensor carrier 28. Shielding element 96 serves to magnetically uncouple first and second magnets 22 and 44 from one another, in order to prevent undesirable influence from the control magnet associated with the respective other sensor. Second control magnet 44 and second sensor 46 together constitute a multi-turn rotary encoder, as already explained above with reference to FIG. 1.

Figure 3:
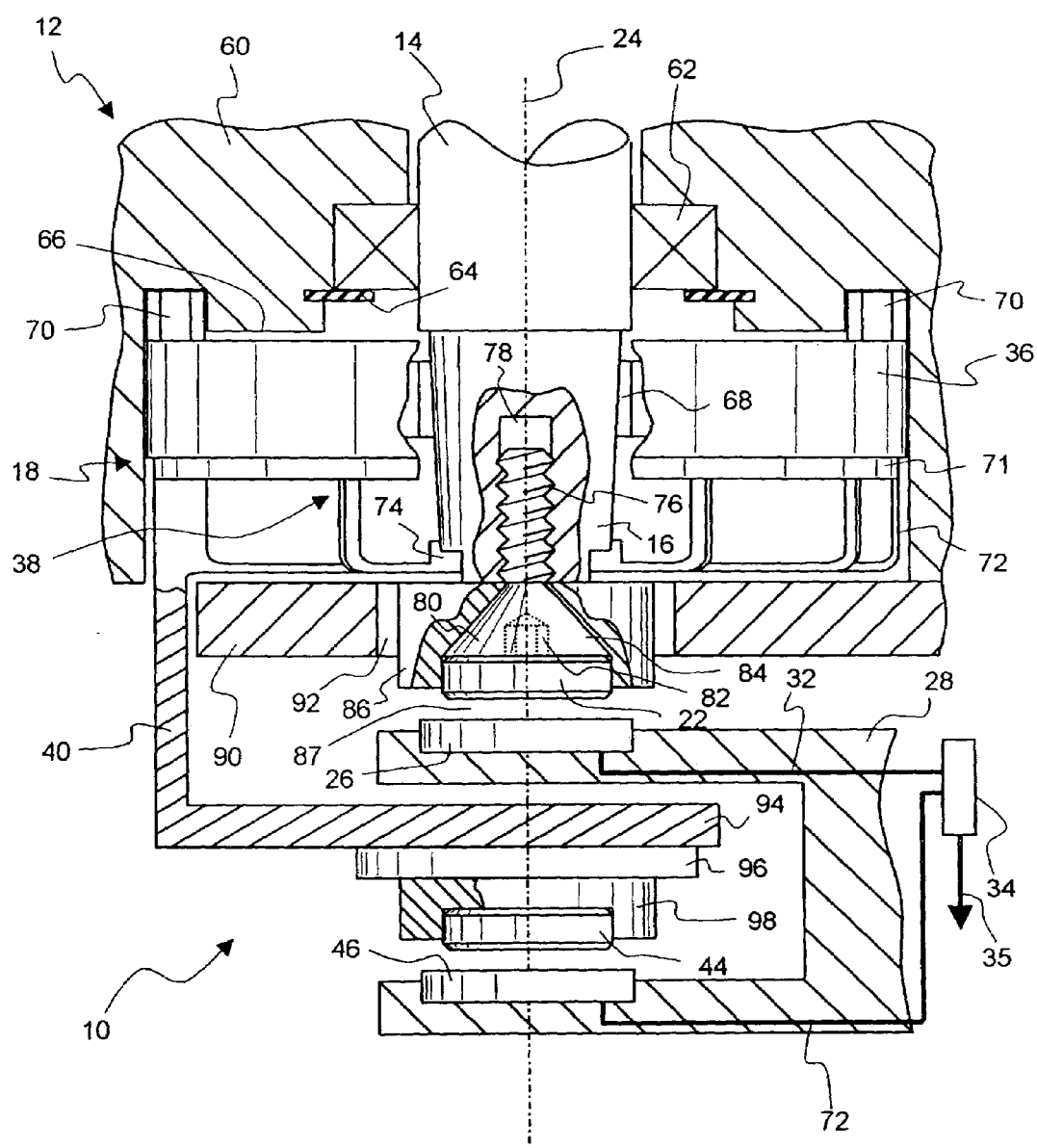
FIG. 3 shows a second exemplary embodiment of the invention, based on the schematic depiction of FIG. 1, in which more details are shown in an axial section.
Figure 4:
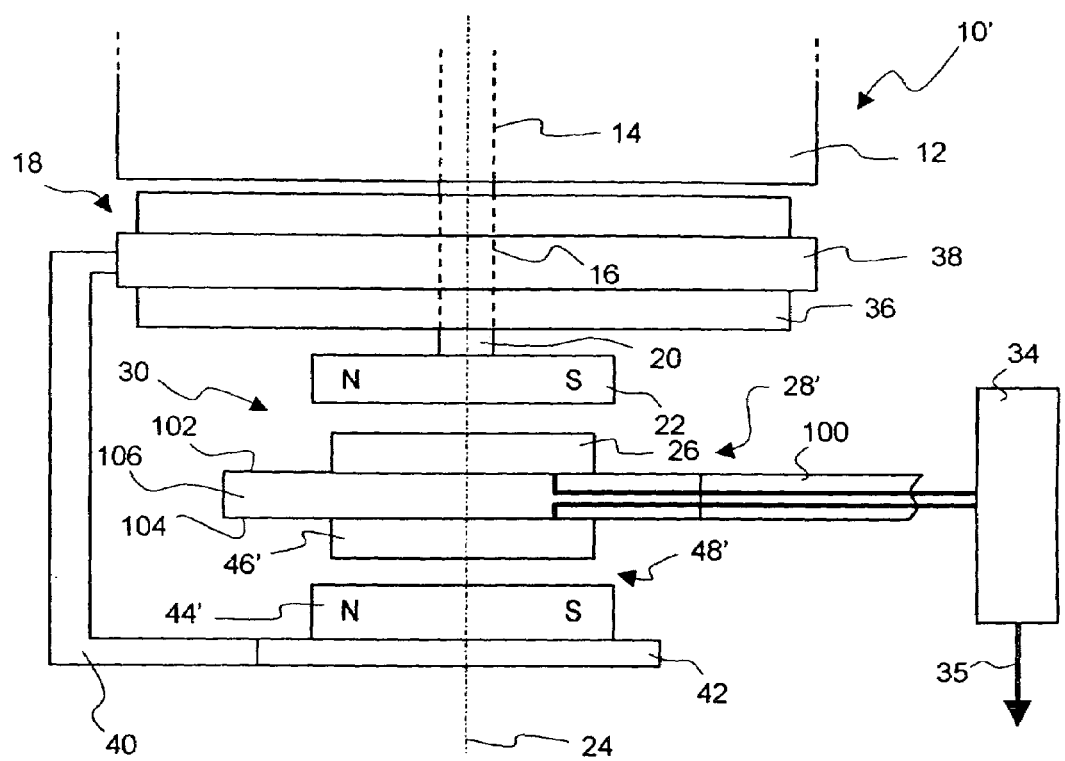
FIG. 4 schematically depicts a third exemplary embodiment of the invention, in plan view as in FIG. 1.

FIG. 4 shows a variant of the apparatus, in a schematic depiction similar to FIG. 1. Sensor carrier 28' of FIG. 4, unlike sensor carrier 28 of FIGS. 1 through 3, is implemented not in a yoke shape but rather as a housing-mounted part having a carrier part 100 on whose upper side 102 first sensor 26 is mounted, and on whose underside 104 second sensor 46' of second rotary encoder 48' is mounted. Second control magnet 44' is accordingly now mounted on the opposing face of rotary element 42. The arrangement shown in FIG. 4 has an overall length in the axial direction that is even shorter than the FIG. 1 structure, since one arm of the U-shaped sensor carrier 28 of FIG. 1 is not needed and has been omitted. In order to ensure sufficient shielding between the two sensors 26 and 46', an end segment 106 of part 100 carrying the two sensors 26 and 46' can be made of a magnetically shielding material, so that an additional shielding element can be dispensed with. The axial length of the apparatus can thereby be further decreased.

Many variants and modifications are, of course possible, within the scope of the present invention, without leaving the context of the invention.

What is claimed is:

1. An apparatus for sensing the absolute value of the rotational position of a shaft, said apparatus comprising:
    a) a first single-turn rotary encoder arranged at one end of the shaft and configured to sense the shaft's rotational position within a single revolution thereof, said first single-turn rotary encoder being circumscribed by an outer periphery;
    b) a second rotary encoder unit for sensing the number of revolutions of said shaft, said second rotary encoder unit comprising:
        i) a reduction gear linkage drivable by the shaft and being arranged annularly around a portion of the shaft, said reduction gear linkage having an output element, driving motion applied by the shaft (14) to the reduction gear linkage (18) translating into a motion coaxial with motion of the shaft;
        ii) a rotary element connected to said output element, said rotary element being located beyond said one end of the shaft but along a common axis therewith;
        iii) a second single-turn rotary encoder configured to sense the rotational position of said rotary element within a single revolution thereof;
        iv) an essentially U-shaped yoke connecting member for drivingly connecting said output element of the reduction gear linkage to said rotary element, said connecting member extending around the outer periphery of the first single-turn rotary encoder.

2. The apparatus according to claim 1, wherein the first single-turn rotary encoder comprises a first sensor and a first permanent magnet coacting therewith, said first permanent magnet being arranged on an end face of the shaft.

3. The apparatus according to claim 2, wherein the first sensor comprises a giant magneto-resistive (GMR) sensor.

4. The apparatus according to claim 2, wherein a magnetic shield is provided between the first rotary encoder and the second rotary encoder, in order to at least partially magnetically uncouple the first and second rotary encoders from one another.

5. The apparatus according to claim 4, wherein the magnetic shield is arranged adjacent the rotary element.

6. The apparatus according to claim 1, wherein the second single-turn rotary encoder comprises a second sensor and a second permanent magnet coacting therewith, the second permanent magnet being arranged on the rotary element.

7. The apparatus according to claim 6, wherein the sensors of the first and the second single-turn rotary encoders are arranged on a common sensor carrier.

8. The apparatus according to claim 7, wherein the common sensor carrier is formed, at least locally, from a magnetically shielded material, in order to magnetically uncouple the sensors of the first and second rotary encoders from one another.

9. The apparatus according to claim 1, wherein the first and second single-turn rotary encoders are arranged adjacent a shaft end of the shaft opposite to an input drive end of that shaft.

10. The apparatus according to claim 1, further comprising
an evaluation unit which receives the output signals of the first and second rotary encoders and generates a common output signal.

11. An apparatus for sensing the absolute value of the rotational position of a shaft, said apparatus comprising:
    a) a first single-turn rotary encoder arranged at one end of the shaft and configured to sense the shaft's rotational position within a single revolution thereof, said first single-turn rotary encoder being circumscribed by an outer periphery, and including a first sensor and a first permanent magnet coacting therewith, said first permanent magnet being arranged on an end face of said shaft;
    b) a second rotary encoder unit, including a second sensor and a second permanent magnet coacting therewith, for sensing the number of revolutions of said shaft, said second rotary encoder unit comprising:
i) a reduction gear linkage drivable by the shaft and being arranged annularly around a portion of the shaft, said reduction gear linkage having an output element;
ii) a rotary element connected to said output element, said rotary element being located beyond said one end of the shaft but along a common axis therewith, said second permanent magnet being arranged on the rotary element;
iii) a second single-turn rotary encoder configured to sense the rotational position of said rotary element within a single revolution thereof; and
iv) a connecting member for drivingly connecting said output element of the reduction gear linkage to said rotary element, said connecting member extending around the outer periphery of the first single-turn rotary encoder;

and wherein the sensors of the first and the second single-turn rotary encoders are arranged on a common sensor carrier formed, at least locally, from a magnetically shielded material, in order to magnetically uncouple the sensors of the first and second rotary encoders from one another.

12. The apparatus according to claim 11, wherein driving motion applied by the shaft to the reduction gear linkage translates into a motion coaxial with motion of the shaft.

13. The apparatus according to claim 11, wherein the connecting member comprises an essentially U-shaped yoke.

14. The apparatus according to claim 11, wherein the second sensor comprises a giant magneto-resistive (GMR) sensor.

* * * * *

UNITED STATES PATENT AND TRADEMARK OFFICE
CERTIFICATE OF CORRECTION

Figure 5:
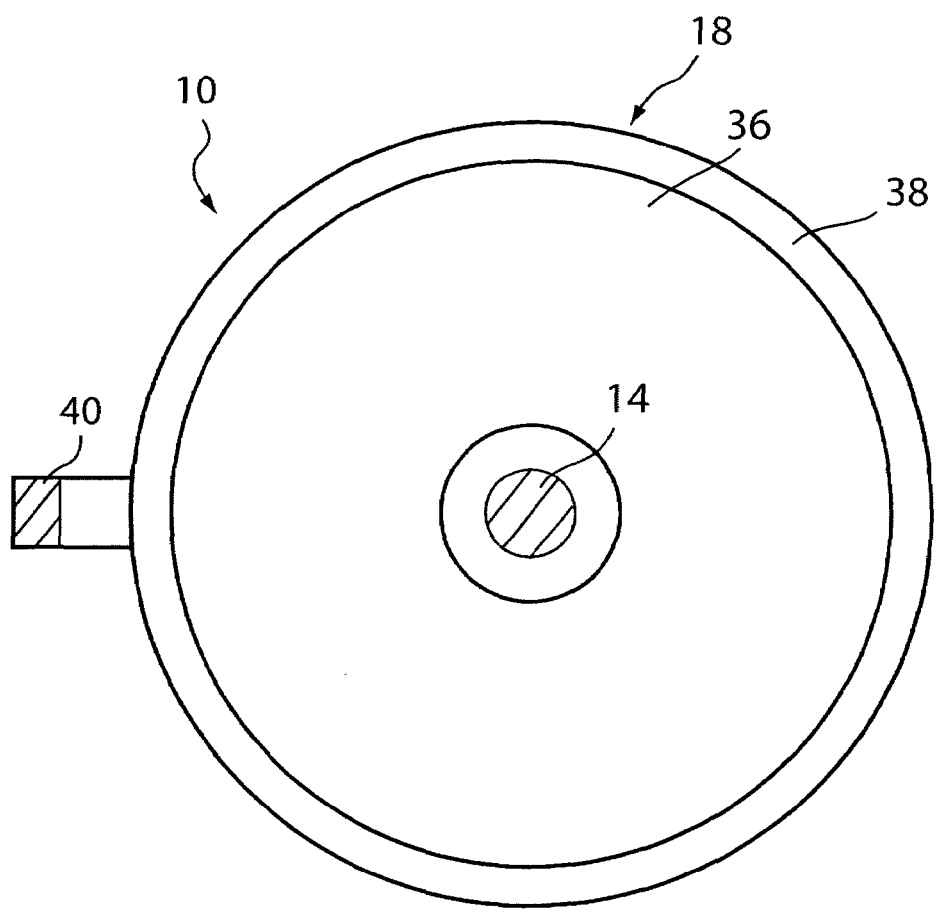

PATENT NO. : 7,292,028 B2  Page 1 of 1
APPLICATION NO. : 10/671909
DATED : November 6, 2007
INVENTOR(S) : Hahn It is certified that error appears in the above-identified patent and that said Letters Patent is hereby corrected as shown below:

In column 3, line 36 after "axial" delete "."
In column 4, line 41 after "encoders" ";" should be -- . --
In column 5, line 17 delete "and"
In column 5, line 19 after "Fig 1" delete "." and insert -- ; and --
In column 5, line 20 insert -- Fig 5 shows the apparatus of Fig 1 in an axial section through rotor shaft 14. --
In column 5, line 26 "12" should be -- 20 --

Signed and Sealed this

Twenty-ninth Day of July, 2008

JON W. DUDAS
*Director of the United States Patent and Trademark Office*